United States Patent [19]

Brant et al.

[11] Patent Number: 4,802,052

[45] Date of Patent: Jan. 31, 1989

[54] LATCHING AND RELEASE SYSTEM FOR GROUND FAULT RECEPTACLE

[75] Inventors: Edward J. Brant, Mattydale; Thomas N. Packard, Syracuse, both of N.Y.

[73] Assignee: Pass & Seymour, Inc., Syracuse, N.Y.

[21] Appl. No.: 5,086

[22] Filed: Jan. 20, 1987

[51] Int. Cl.[4] .................................... H02H 3/16

[52] U.S. Cl. .................................... 361/42; 361/45; 335/18; 335/202

[58] Field of Search .................... 335/6, 18, 16, 202, 335/174, 172; 361/42-50

[56] References Cited

U.S. PATENT DOCUMENTS

| | | | |
|---|---|---|---|
| 4,001,647 | 1/1977 | Klein et al. | 361/42 |
| 4,013,929 | 3/1977 | Dietz et al. | 361/42 X |
| 4,034,266 | 7/1977 | Virani et al. | 361/42 |
| 4,521,824 | 6/1985 | Morris et al. | 361/45 |
| 4,595,894 | 6/1986 | Doyle et al. | 361/42 X |

*Primary Examiner*—A. D. Pellinen
*Assistant Examiner*—A. Jonathan Wysocki
*Attorney, Agent, or Firm*—Charles S. McGuire

[57] ABSTRACT

A ground fault receptacle having novel mechanical members for latching and moving the movable, circuit-breaking contacts, and for protecting against line-to-line arcing as the contacts make and break. The movable contacts are carried on a pair of conducting, self-biasing, spring arms which are held in a flexed position by a latch block which moves with the arms and is retained in position by a stem on the reset button and cooperating latch member. The parts are constructed and arranged to permit the use of relatively large test and reset buttons which are centrally arranged on the front of a duplex receptacle housing.

7 Claims, 4 Drawing Sheets

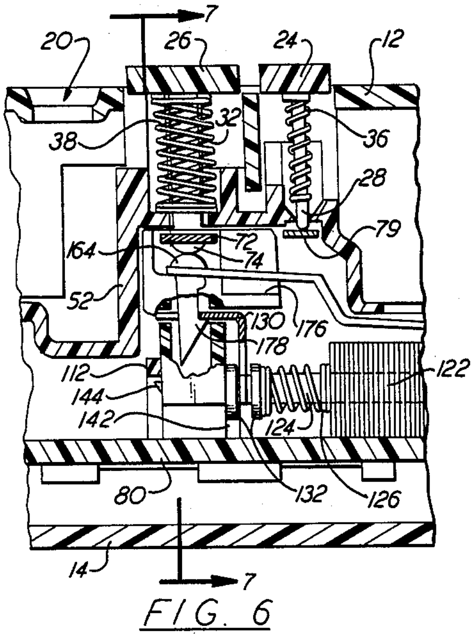
F/G. 6
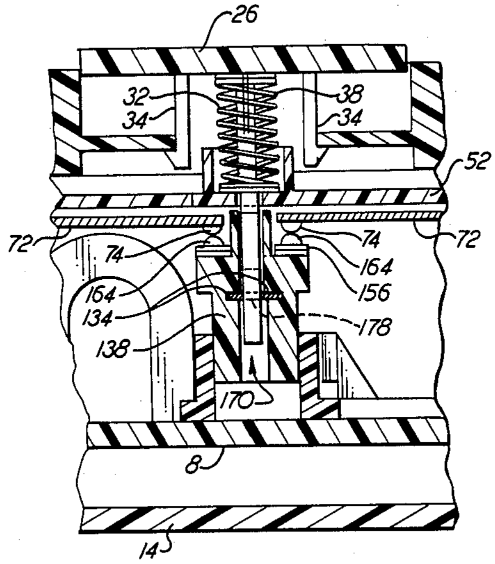
F/G. 7
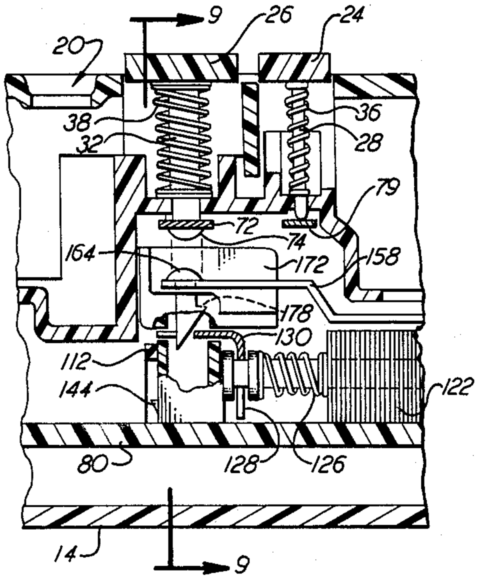
F/G. 8
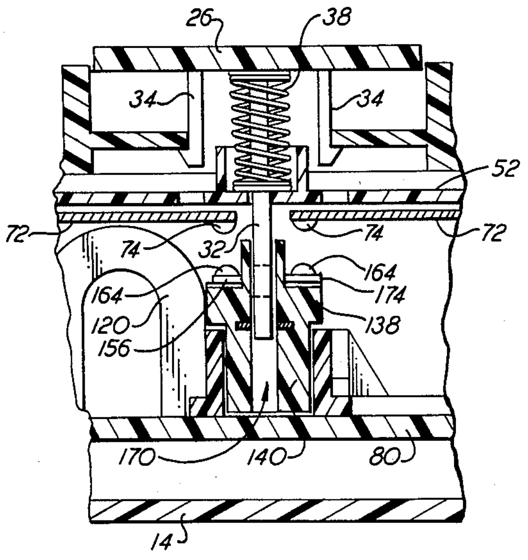
F/G. 9

LATCHING AND RELEASE SYSTEM FOR GROUND FAULT RECEPTACLE

The present invention relates to ground fault circuit interrupting means mounted in a wall receptacle. More specifically, the invention relates to means for releasably maintaining the contacts of a ground fault circuit interrupter in closed relation and for moving the contacts between open and closed relation.

Electrical receptacles having means for interrupting electrical power to an appliance, tool, or other load connected by a plug to the receptacle, commonly use a solenoid for initiating the movement which results in opening the contacts through which power is supplied under normal conditions. In many ground fault receptacles, a pair of movable contacts are biased toward the open position and are maintained in closed relation with the fixed contacts by latching means which are released by operation of the solenoid. After the circuit has "tripped," i.e., the movable contacts have been moved away from the fixed contacts, means are provided for placing them back in the closed and latched position. Such means commonly include a reset button for manual engagement and movement, accessible on the exterior of the receptacle.

Although receptacles having ground fault protection include a great deal many more components than standard wall receptacles, it is desireable that the overall size of GFI receptacles be essentially the same as a standard receptacle so that both may be mounted in the same junction boxes. However, reliability of the device should not be compromised by size requirements. In addition, while the overall dimensions of the GFI receptacle should be relatively small, it is desirable that the test and reset buttons be as large as possible to permit easier access and manual manipulation, larger and more detailed graphics on the visible surfaces, etc. Patents directed to various improvements in ground fault receptacle latching means, reset and test buttons, and the like, include U.S. Pat. Nos. 4,001,647, 4,013,929, 4,084,203 and 4,209,762.

It is a principal object of the present invention to provide a ground fault receptacle having novel and improved means for latching and moving the contacts through which the circuit is interrupted, permitting a more economical use of space.

Another object is to provide a ground fault receptacle with a pair of adjacent, conductive arms carrying movable switch contacts with a wall incorporated in movable latch means to prevent arcing between the arms.

A further object is to provide a ground fault receptacle with means for latching and resetting the movable contacts which are constructed and arranged to permit the use of relatively large test and reset buttons on the front of the unit.

Other objects will in part be obvious and will in part appear hereinafter.

SUMMARY OF THE INVENTION

The foregoing objects are attained according to the invention by a ground fault receptacle having a pair of movable contacts on the free ends of side-by-side spring arms which are retained in a flexed position during normal circuit operation by means of a traveling latch block. The block is held in position by an L-shaped latch member having one leg extending into a slot in the block and the other leg engaged with a solenoid armature. An edge of the leg extending into the block is engaged in a notch on a pin extending integrally from the reset button into the interior of the receptacle. A coil spring urges the reset button and pin in a direction which moves the latch member and latch block to a position wherein the spring arms are flexed by the latch block and the movable contacts are held in engagement with the fixed contacts.

The movable latch block is made of plastic or other dielectric material and includes an integral wall portion which is positioned between the two spring arms carrying the movable contacts. The wall portion thus serves as what is commonly termed an "arc chute," preventing electrical arcing between the conducting spring arms as the contacts thereon are moved away from the fixed contacts.

The latch block is positioned near the center of the receptacle and has a through opening into which the reset button pin extends to engage the latch member. The receptacle yoke or strap which carries the grounding contacts and mounting ears is flat, i.e., extends straight through the receptacle housing, and has a central opening through which the reset button stem extends. This construction permits the reset button to be mounted centrally, between the prong-receiving openings in the front of the receptacle housing, and to extend essentially fully from side to side of the housing, making it considerably larger than the usual, small, square reset buttons on ground fault receptacles. Likewise, the test button extends from side to side of the housing, the reset and test buttons being arranged one over the other and together extending essentially fully between the plug-receiving holes in a duplex receptacle.

Details of the constructional features summarized above, and others, will be more apparent with reference to the accompanying drawings and following detailed description of the preferred embodiment of the invention.

BRIEF DESCRIPTION OF THE DRAWING

FIG. 6 is an enlarged, fragmentary, side view in section, showing certain elements of the receptacle in a first operational position;

FIG. 7 is a front elevational view, in section on the line 7—7 of FIG. 6;

FIG. 8 is a side elevational view of the elements of FIG. 6, shown in a second operational position;

FIG. 9 is a front elevational view, in section on line 9—9 of FIG. 8; and

DETAILED DESCRIPTION

Figure 1:
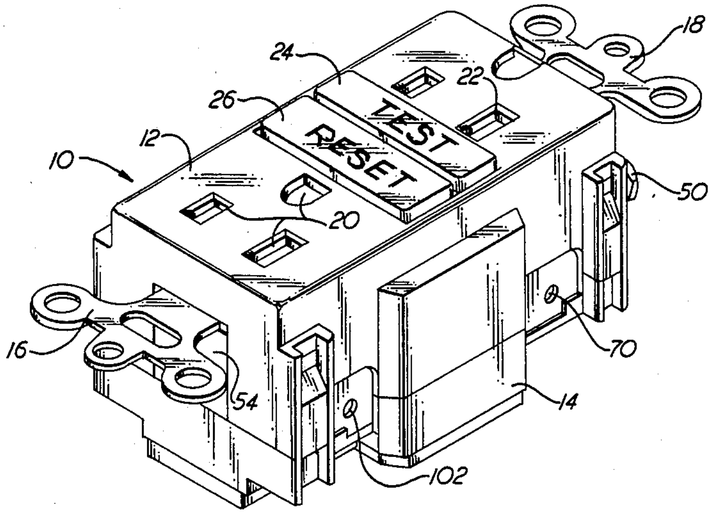
FIG. 1 is a perspective view showing the front of a fully assembled ground fault receptacle incorporating the invention.

Referring now to the drawings, in FIG. 1 is seen a duplex electrical wall receptacle of the type which provides automatic circuit interruption in response to a ground fault condition, the receptacle being generally denoted by reference numeral 10 and hereinafter referred to as a GFI receptacle. The usual housing means for the components of GFI receptacle 10 is provided by mating front and rear body portions 12 and 14, respectively. A preferred means of assembly and mating engagement of body portions 12 and 14 is described in detail in copending application Ser. No. 5,085, filed of even date herewith, but forms no part of the present invention.

Figure 2:
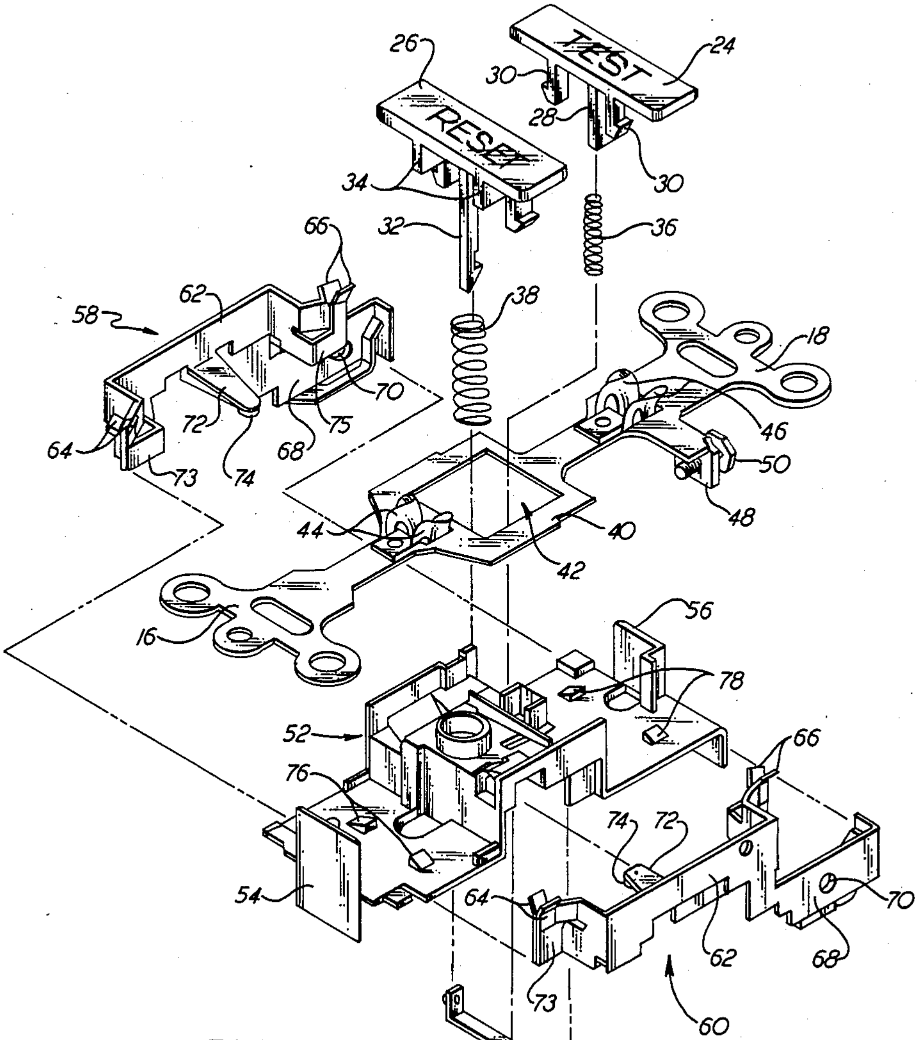
FIG. 2 is an exploded, perspective view of certain elements of the ground fault receptacle of FIG. 1.

Mounting ears 16 and 18 on the grounding strap, shown more fully in FIG. 2, extend through openings in opposite ends of the receptacle housing means. Two sets of openings 20 and 22 are provided in front body portion 12 to receive the prongs of conventional plugs on the ends of line cords connected to an appliance, tool, or other electrical load which receives power through GFI receptacle 10. It should be understood that the principles of the present invention are not limited to employment with duplex-type receptacles, although certain constructional features are particularly suited to such receptacles and are so indicated in the claims. Details of the exterior of GFI receptacle 10 pertinent to the present invention include manually engageable test and reset buttons 24 and 26, respectively, positioned one over the other to extend substantially the full distance between the two sets of openings 20 and 22, both buttons extending substantially from side to side of the front body portion 12 and arranged in suitable recesses therein.

Referring now to FIG. 2, pin 28 and arms 30 extend integrally from test button 24; similarly, stem 32 and arms 34 extend integrally from reset button 26. The buttons, pins and arms are preferably formed as one-piece plastic moldings, with the arms having limited flexibility for movement with respect to the associated buttons for purposes which will be explained later. Coil springs 36 and 38 surround pin 28 and stem 32, respectively, to urge buttons 24 and 26 toward an outward position with respect to body portion 12, as also explained in more detail hereinafter.

With continuing reference to FIG. 2, grounding strap 40, with mounting ears 16 and 18 on opposite ends thereof, is seen to be essentially flat, having central opening 42, on opposite sides of which are connected prong receptacles 44 and 46. In the assembled condition of GFI receptacle 10, prong receptacles 44 and 46 are aligned with the uppermost of openings 20 and 22 to receive the grounding prong of a plug connected to the receptacle. Ear 48 is bent downwardly from strap 40 and has a threaded opening to receive screw 50 for connection of an external ground wire.

A unitary, molded plastic element with compound surfaces, termed a separator and denoted by reference numeral 52 is also shown in FIG. 2. Separator 52 includes end wall portions 54 and 56 which mate with portions of housing sections 12 and 14 to form exterior portions of the housing of receptacle 10, part of end wall portion 54 being seen in FIG. 1. Separator 52 extends across the interior of receptacle 10 essentially from side to side and end to end, separating the interior of the receptacle into two compartments, with the grounding strap and plug prong receiving contacts on the load terminals on one side and the ground fault circuitry, solenoid, fixed and movable contacts and wire termination connections on the other side.

Separator 52 further serves as a support for load terminals 58 and 60, which are mounted upon the separator to provide a sub-assembly of the receptacle. Load terminals 58 and 60 are formed from single sheets of high conductive metal such as brass or copper, bent to the desired configuration. Each of load terminals 58 and 60 includes side portion 62, having angularly extending portions 64 and 66 at opposite ends which form resilient contacts for receiving the prongs of plugs inserted in receptacle 10. Extending downwardly and outwardly from one of the ends of side portions 62 are wire termination arms 68, each having a threaded opening 70, the opening in the termination arm of terminal 58 also being shown in FIG. 1 where it is seen to be accessible from the exterior of receptacle 10. Thus, the load wires of the electrical circuit which includes receptacle 10 may be connected to load terminals 58 and 60 by screws inserted in openings 70.

Contact arms 72 extend inwardly from side portions 62 of load terminals 58 and 60. Rounded electrical contacts 74 are affixed to or formed integrally with the lower (as viewed in FIG. 2) surfaces of arms 72 near the terminal ends thereof. As explained later, contacts 74 provide the fixed set of contacts through which the circuit is interrupted upon the occurrence of a ground fault or similar circuit malfunction. Load terminals 58 and 60 are assembled with separator 52 by a metal-to-plastic snap fit of lower edges 73 and 75 of angularly extending portions 64 and 66 over ramped portions 76 and 78, respectively, on the upper surface of separator 52, as also explained in application Ser. No. 5,085.

A further element shown in FIG. 2 is flexible blade 79, which forms a necessary portion of the GFI receptacle. Blade 79 is moved by pin 28 when test button 24 is depressed to establish electrical contact between load terminal 60 and the ground fault circuitry to create an electrical condition analagous to a ground fault whereby, if all elements are working properly, the contacts open to break the circuit. The structure and operation of the elements which provide testing for proper operation of the GFI receptacle are shown and described in more detail in aforementioned application Ser. No. 5,100.

Figure 4:
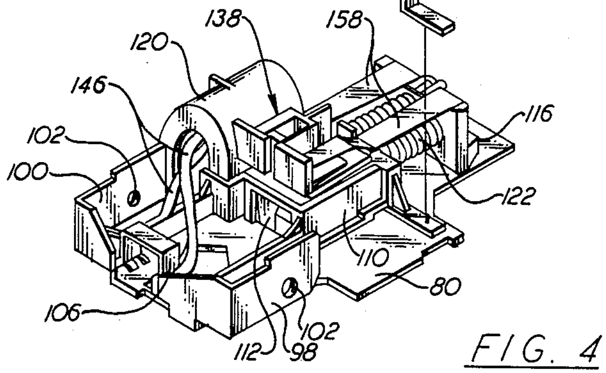
FIG. 4 is a perspective view of the elements of FIG. 3, shown assembled relation.
Figure 3:
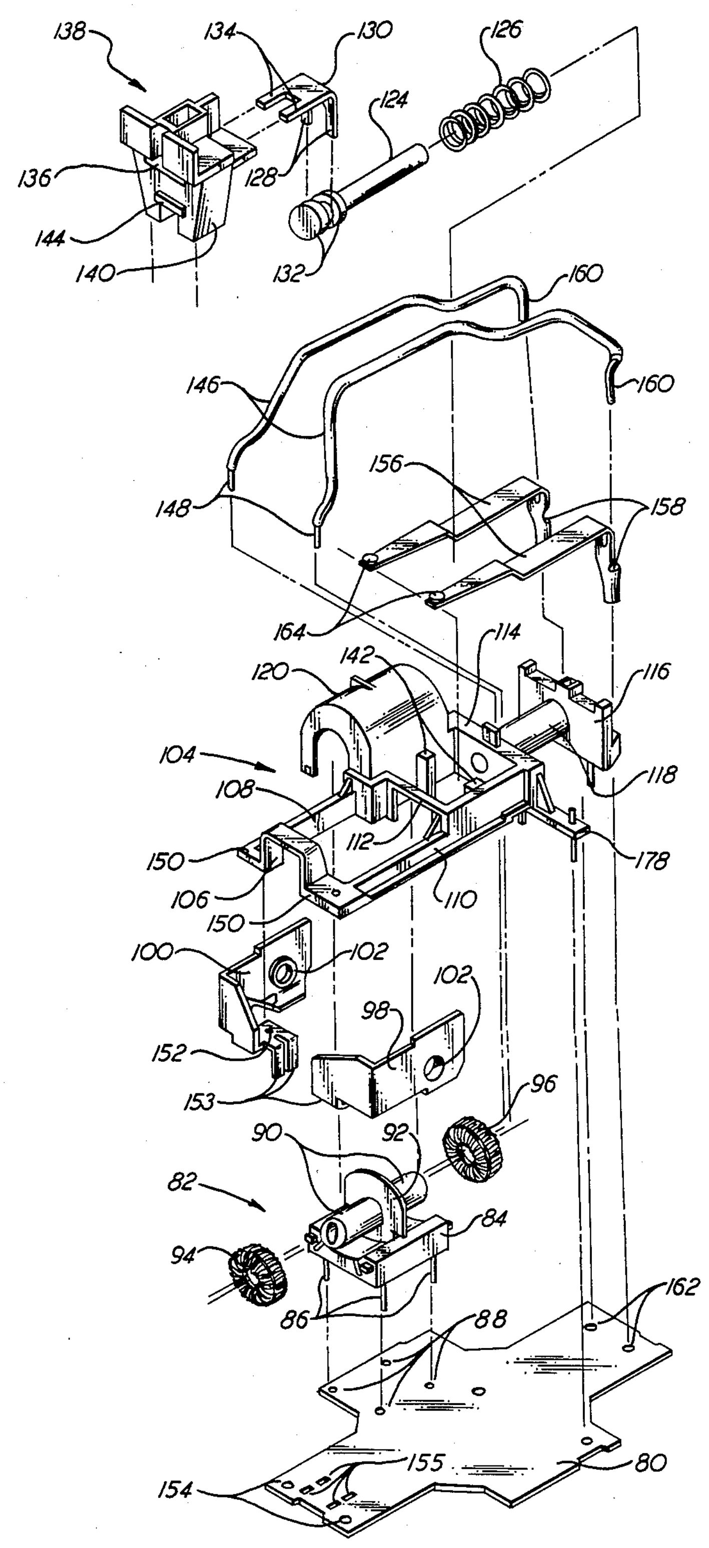
FIG. 3 is an exploded, perspective view of additional elements of the receptacle.

Elements of a further subassembly of receptacle 10 are shown in exploded perspective in FIG. 3, and in assembled perspective in FIG. 4. The individual components of the ground fault electronic circuitry are all surface-mounted on the front surface of circuit board 80, the back surface of which is seen in FIGS. 3 and 4. In distinction from prior ground fault receptacles of this type, the coils, relay, movable contacts, and other elements of the ground fault system are mounted on the rear surface of the board. Unitary, molded plastic part 82 includes base portion 84 with four pins 86, extending downwardly therefrom for insertion through openings 88 in board 80. Hollow cylindrical portion 90 extends through wall member 92, all being integral portions of plastic part 82. Coils 94 and 96 are mounted upon cylindrical portion 90, on opposite side of wall member 92, and comprise toroidal cores wrapped with multiple turns of copper wire in the usual fashion. It is preferred that the cores of coils 94 and 96 be of the ferrite type. Terminals 98 and 100 for the line wires of the circuit in which receptacle 10 is connected include threaded openings 102 for receiving a screw to effect connection of the line wires to the terminals, the opening 102 of one of the terminals being seen in FIG. 3. Terminals 98 and 100 also include means for effecting push wire terminations, alternatively to the screw connections, as described in application Ser. No. 5085.

A second, unitary, molded plastic part 104 includes forward frame portion 106, side frame portions 108 and 110, intermediate frame portion 112, and two rear frame portions 114 and 116, held in spaced relation by hollow, cylindrical member 118. Curved housing portion 120 extends from side frame portion 108, and is arranged in covering relation to coils 94 and 96 in the fully assembled condition of the subassembly, as shown in FIG. 4. Solenoid coil 122 (FIG. 4) encircles cylindrical member 118, and armature 124, biased to an outer position by spring 126, travels within hollow member 118 to an inner position when coil 122 is energized.

Lower legs 128 of L-shaped latch member 130 straddle armature 124 between spaced collars 132. Thus, as armature 124 travels between its outer and inner positions, latch member 130 is moved therewith to effect opening of the circuit contacts in a manner explained later. Upper legs 134 of latch member 130 are inserted into through slot 136 of molded plastic latch block 138. Lower portion 140 of the latch block is slidingly received in a recess in plastic part 104 between intermediate wall portion 112 and posts 142 for reciprocating, up and down movement. When the parts are assembled, lip 144 on latch block 138 snaps under intermediate wall portion 112 to prevent the latch block from moving upwardly, out of the recess, beyond the point where lip 144 contacts the lower edge of wall portion 112. Legs 128 and 134 of latch member 130 are long enough, relative to the travel of armature 124 and latch block 138, that neither is withdrawn from engagement over armature 124 and within slot 136 by movement of the parts during operation of the ground fault interrupting elements.

Wires 146 pass through hollow portion 90 of part 82, and thus through coils 94 and 96. Ends 148 of wires 146 pass through openings 150 in forward frame portion 106 of part 104, openings 152 in terminals 98 and 100, being electrically connected to the terminals, and through openings 154 in circuit board 80. Legs 153 of terminals 98 and 100 pass through openings 155 in board 80. A pair of spring arms 156 have end portions 158 which are anchored in openings end wall portion 116. Ends 160 of wires 146 pass through and are electrically connected, e.g., by soldering, to end portions 158, and further pass through the openings in end wall portion 116 and openings 162 in circuit board 80. Rounded contacts 164 are carried on the free ends of spring arms 156.

Figure 5A:
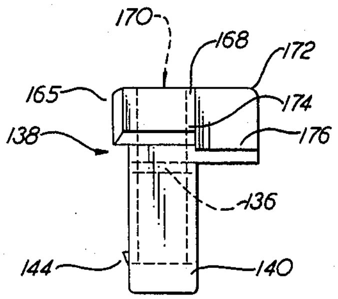
FIGS. 5A–5C are side and rear elevational and top plan views, respectively, of one of the elements of FIGS. 3 and 4.
Figure 5B:
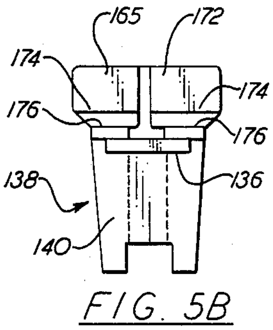
Figure 5C:
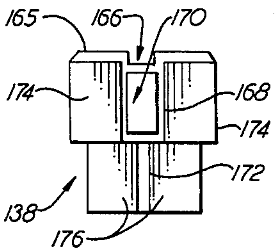

Latch block 138, forming an important part of the present invention, is shown separately in enlarged side, rear and top views in FIGS. 5A–5C. Lower portion 140, which includes through slot 136 and lip 144, is integrally formed with the upper portion of the block which includes end wall 165 with centrally disposed, vertical recess 166 in the rear surface thereof. Extending forwardly from the central portion of end wall 165 is rectangular wall section 168, defining opening 170 extending vertically through block 138. Vertical wall 172 extends forwardly from the front of wall section 168. A pair of co-planar, horizontally disposed surfaces 174 are disposed on opposite sides of wall section 168, and a second pair of such surfaces 176, parallel to and at a lower horizontal level than surfaces 174, are separated by wall 172.

Turning now to FIGS. 6–10, operation of latch block 138 and associated elements of GFI receptacle 10 as the circuit contacts move between open and closed positions is illustrated. In FIGS. 6 and 7 the elements are shown in their positions of normal operation, i.e.g, with the two sets of contacts 74 and 164 closed to provide power between source and load. Spring arms 156 rest, adjacent their terminal ends, on surfaces 174 of latch block 138. Latch 130 is engaged in the edge portion thereof between legs 134 by stepped lip 178 on reset button pin 32. Spring 38, having a lower end surrounded by circular portion 180 of separator 52, biases reset button 26 upwardly, whereby lip 178 holds latch member 130 and thus latch block 138 in the position of FIGS. 6 and 7. The free ends of spring arms 156 are flexed upwardly from their normal, unflexed position to the positions shown in FIGS. 6 and 7, and thus exert a biasing force downwardly on latch block 138 and latch member 130. The upward biasing force of spring 38, however, is considerably greater than the opposing force of spring arms 156, thus maintaining reset button 26 and the other elements in their positions of FIGS. 6 and 7, the limit of travel being established by engagement of contacts 164 with contacts 74.

Upon the occurence of a ground fault, or similar electrical disfunction causing an imbalance of current flow in wires 146, the resulting signal from sensing coil 96 is used to cause energization of solenoid coil 122, thereby moving armature 124 to the right, as seen in FIG. 6. This movement of the solenoid armature moves latch member 130 to the right, due to engagement of legs 128 between collars 132, thereby moving the edge portion between legs 134 of latch member 130 off of lip 178. Latch member 130, latch block 138 and spring arms 156 may thus move downwardly, from the positions of FIGS. 6 and 7 to those of FIGS. 8 and 9, such movement being provided by the biasing force of spring arms 156. Thus, contacts 164 are moved to break contact with fixed contacts 74, and the circuit is broken to remove electrical power from the load which i connected to GFI receptacle 10.

Figure 10:
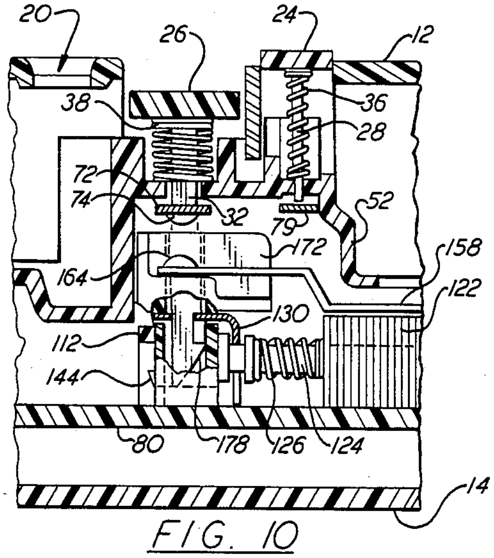
FIG. 10 is a further side elevational view of the elements of FIGS. 6 and 8 in yet another operational position.

In order to reset the movable elements and re-establish circuit continuity, reset button is manually depressed, thereby compressing spring 38, as seen in FIG. 10. This moves stem 32 downwardly, through opening 170 in latch block 138. As stepped lip 178 passes the edge portion between legs 134 of latch member 130, the latter moves slightly toward the right, but returns to its normal position, as shown in FIG. 10, upon continued downward movement of stem 32. As reset button 26 is released, it will be moved upwardly by spring 38 from the FIG. 10 position back to that of FIG. 6. Engagement of lip 178 with latch member 130, and engagement of the latter in slot 136 of latch block 138, moves the latch member and block which, in turn, moves the free ends of spring arms 156 to again move contacts 164 into engagement with contacts 74. It should be noted that the fit of lower portion 140 of latch block 138 in the recess in plastic part 104 is rather loose to allow some amount of turning movement of the latch block, thereby assuring engagement of both sets of contacts 164 and 74 even though contacts 74 may not be at exactly the same vertical level, as seen in FIGS. 7 and 9. The circuitry used in receptacle 10 is designed to provide only momentary energization of solenoid coil 122, whereby armature 124 moves back to the left under the biasing force of spring 26, very quickly after moving to the right and is shown in its original position in FIGS. 8–10.

Since spring arms 156 serve as conductors as well as means for biasing movable contacts 164 to the open position, and are in closely spaced relation, it is necessary that they be separated by a dielectric material in the area adjacent the free ends which carry the contacts in order to prevent line-to-line arcing as the circuit is broken. In the GFI receptacle of the present invention, this function is provided by medial wall portion 172, as well as wall sections 168, on latch block 138 which moves together with contacts 164 and spring arms 156. Stem 32 of reset button 26 also extends between the two sets of fixed and movable contacts, thus assisting in the arc chute function.

What is claimed is:

1. In a ground fault circuit interrupter having a pair of fixed contacts and a pair of contacts movable between engaged and disengaged positions with respect to said fixed contacts to complete and break circuit continuity between an electrical source and load, means for effecting movement of said movable contacts, said means comprising:

(a) a pair of substantially parallel, elongated arms of flexible, springy, electrically conducting material each having an anchored end and a free end, said movable contacts being respectively mounted upon said free ends, whereby said arms are naturally biased toward an unflexed position when said free ends are moved to and held in a flexed position;

(b) a latch block and a first axis along which said latch block is movable between a first position, wherein said block contacts said arms adjacent said free ends thereof and holds said arms in said flexed position with said movable contacts engaged with said fixed contacts, and a second position, wherein said free ends of said arms are moved under the natural bias thereof to move said movable contacts out of engagement with said fixed contacts;

(c) an L-shaped latch member having first and second portions arranged at substantially 90° to one another and a second axis, substantially perpendicular to said first axis, along which said latch member is movable independently of said block between a latched position, wherein said first portion of said latch member engages and holds said latch block in said first position thereof, and an unlatched position, permitting movement of said latch block and said latch member along said first axis to said second position;

(d) means for releasably holding said latch member in said latched position;

(e) a solenoid including a coil and an armature movable along said second axis and having an end portion directly engageable with said second portion of said latch member to contact and move the latter along said second axis to said unlatched position; and (f) circuit means operable in response to a ground fault between said source and said load to change the energized state of said coil, thereby moving said armature and said latch member along said second axis to move said latch member to said unlatched position, permitting movement of said latch block and said latch member along said first axis, permitting movement of said free ends of said arms to move said movable contacts out of engagement with said fixed contacts.

2. The invention according to claim 1 wherein said latch block includes first and second openings extending along said first and second axes, respectively, said means for releasably holding said latch member including a portion extending into said first opening, and said first portion of said latch member extending into said second opening for engagement with said holding means when said latch member is in said latched position.

3. The invention according to claim 2 wherein said second portion of said latch member includes a pair of spaced legs straddling said end portion of said armature.

4. The invention according to claim 3 wherein said end portion includes a pair of spaced collars between which said spaced legs are positioned, whereby movement of said armature in both directions along said second axis is transmitted to said latch member and portions of said legs remain between said collars as said latch member moves with said latch block along said first axis.

5. The invention according to claim 4 wherein said means for holding said latch member in said latched position includes a stem extending into said first opening from a reset button accessible for manual operation on the exterior of said receptacle.

6. The invention according to claim 5 wherein said stem includes a first edge portion which is engaged with a second edge portion on said first portion of said latch member when in said latched position.

7. The invention according to claim 6 and further including a coil spring biasing said stem toward movement along said first axis to a position wherein said latch member holds said latch to maintain said arms with said movable contacts in engagement with said fixed contacts.

* * * * *